US010077007B2

(12) United States Patent
Meyhofer et al.

(10) Patent No.: US 10,077,007 B2
(45) Date of Patent: Sep. 18, 2018

(54) SIDEPOD STEREO CAMERA SYSTEM FOR AN AUTONOMOUS VEHICLE

(71) Applicant: Uber Technologies, Inc., San Francisco, CA (US)

(72) Inventors: Eric Meyhofer, Pittsburgh, PA (US); David Rice, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/069,428

(22) Filed: Mar. 14, 2016

(65) Prior Publication Data

US 2017/0259753 A1    Sep. 14, 2017

(51) Int. Cl.
| | |
|---|---|
| *B60R 11/04* | (2006.01) |
| *H04N 13/02* | (2006.01) |
| *H04N 13/00* | (2018.01) |
| *H04N 5/232* | (2006.01) |
| *B60R 1/12* | (2006.01) |
| *H04N 5/225* | (2006.01) |

(52) U.S. Cl.
CPC ............ *B60R 11/04* (2013.01); *B60R 1/12* (2013.01); *H04N 5/2257* (2013.01); *H04N 5/23238* (2013.01); *H04N 13/0055* (2013.01); *H04N 13/0203* (2013.01); *B60R 2001/1253* (2013.01); *H04N 2013/0081* (2013.01)

(58) Field of Classification Search
CPC .......... B60R 11/04; B60R 1/12; H04N 5/2252
See application file for complete search history.

(56) References Cited

U.S. PATENT DOCUMENTS

| 3,333,519 | A | 8/1967 | Padelt | |
|---|---|---|---|---|
| 5,357,141 | A | 10/1994 | Nitschke | |
| 7,106,365 | B1* | 9/2006 | Sogawa | B60R 1/00 348/148 |
| 7,111,996 | B2* | 9/2006 | Seger | B60R 11/04 348/148 |
| 8,108,119 | B2* | 1/2012 | Southall | B60T 7/22 382/103 |
| 8,199,975 | B2* | 6/2012 | Pomerleau | B60R 1/00 340/937 |
| 8,385,630 | B2* | 2/2013 | Sizintsev | G06T 7/97 348/42 |

(Continued)

FOREIGN PATENT DOCUMENTS

EP    1816514    8/2007

OTHER PUBLICATIONS

International Preliminary Report on Patentability issued in PCT/US2014/027126 dated Sep. 24, 2015.

(Continued)

*Primary Examiner* — Jay Au Patel
*Assistant Examiner* — Irfan Habib
(74) *Attorney, Agent, or Firm* — Mahamedi IP Law LLP

(57) ABSTRACT

A sidepod stereo camera system for an autonomous vehicle (AV) includes a sidepod housing mounted to the AV, a view pane coupled to the sidepod housing, and a stereo camera mounted within the sidepod housing. The stereo camera has a field of view extending outward from the sidepod housing through the view pane. A control system of the sidepod stereo camera system or the AV can conditionally activate and deactivate the sidepod stereo camera system when needed.

20 Claims, 7 Drawing Sheets

(56) References Cited

U.S. PATENT DOCUMENTS

| | | | |
|---|---|---|---|
| 8,411,145 B2* | 4/2013 | Fardi | B60R 1/00 348/148 |
| 8,447,098 B1* | 5/2013 | Cohen | G06K 9/00 382/154 |
| 8,599,001 B2* | 12/2013 | Schofield | B60N 2/002 340/425.5 |
| 8,611,604 B2* | 12/2013 | Fujiyoshi | G01S 17/89 382/103 |
| 8,665,079 B2* | 3/2014 | Pawlicki | G06T 7/13 340/435 |
| 9,191,634 B2* | 11/2015 | Schofield | G06K 9/00818 |
| 9,196,160 B2* | 11/2015 | Aoki | G08G 1/0175 |
| 9,221,396 B1* | 12/2015 | Zhu | B60Q 9/008 |
| 9,278,689 B1* | 3/2016 | Delp | B60W 30/00 |
| 9,315,151 B2* | 4/2016 | Taylor | B60R 1/00 |
| 9,403,491 B2* | 8/2016 | Happy | B60R 1/006 |
| 9,436,880 B2* | 9/2016 | Bos | B60N 2/002 |
| 9,509,979 B2* | 11/2016 | Livyatan | B60R 1/00 |
| 9,555,736 B2* | 1/2017 | Solar | B60Q 1/143 |
| 9,555,803 B2* | 1/2017 | Pawlicki | B60K 31/0008 |
| 9,600,768 B1* | 3/2017 | Ferguson | G06N 5/02 |
| 9,604,581 B2* | 3/2017 | Wierich | H04N 9/735 |
| 9,616,896 B1* | 4/2017 | Letwin | B60W 30/182 |
| 9,630,568 B2* | 4/2017 | Kuhn | B60R 11/04 |
| 9,637,053 B2* | 5/2017 | Schofield | B60R 1/025 |
| 9,639,951 B2* | 5/2017 | Salahat | G06T 7/136 |
| 9,643,605 B2* | 5/2017 | Pawlicki | B60T 7/22 |
| 9,665,780 B2* | 5/2017 | Kumano | G06K 9/00798 |
| 9,672,446 B1* | 6/2017 | Vallespi-Gonzalez | G06K 9/6267 |
| 9,674,490 B2* | 6/2017 | Koravadi | H04N 7/181 |
| 9,707,959 B2* | 7/2017 | Suzuki | B60W 30/06 |
| 9,729,858 B2* | 8/2017 | Livyatan | H04N 13/0246 |
| 9,731,653 B2* | 8/2017 | Lynam | B60R 1/00 |
| 9,736,435 B2* | 8/2017 | Schofield | H04N 7/183 |
| 9,740,205 B2* | 8/2017 | Ross | G05D 1/0088 |
| 9,744,968 B2* | 8/2017 | Miyano | G06K 9/00791 |
| 9,753,542 B2* | 9/2017 | Chizeck | G06F 3/016 |
| 9,772,496 B2* | 9/2017 | Kimura | G02B 27/0179 |
| 9,776,568 B2* | 10/2017 | Hoyda | B60R 1/002 |
| 9,779,313 B2* | 10/2017 | Pliefke | G06K 9/00805 |
| 9,785,150 B2* | 10/2017 | Sibenac | G05D 1/0231 |
| 9,789,880 B2* | 10/2017 | Sweeney | B60W 50/16 |
| 9,834,153 B2* | 12/2017 | Gupta | B60R 11/04 |
| 9,834,216 B2* | 12/2017 | Pawlicki | B60W 30/18 |
| 9,840,256 B1* | 12/2017 | Valois | H04L 67/12 |
| 9,841,763 B1* | 12/2017 | Valois | G05D 1/0088 |
| 9,870,512 B2* | 1/2018 | Rogan | G06K 9/00805 |
| 9,881,503 B1* | 1/2018 | Goldman-Shenhar | G08G 1/166 |
| 9,884,631 B2* | 2/2018 | James | B60W 50/082 |
| 9,902,311 B2* | 2/2018 | Sweeney | B60Q 1/2611 |
| 9,902,403 B2* | 2/2018 | Donnelly | B60W 50/0098 |
| 9,904,375 B1* | 2/2018 | Donnelly | G06F 3/0346 |
| 2002/0007119 A1 | 1/2002 | Pelissier | |
| 2005/0185845 A1 | 8/2005 | Luo | |
| 2005/0185846 A1 | 8/2005 | Luo | |
| 2005/0196015 A1 | 9/2005 | Luo | |
| 2005/0196035 A1 | 9/2005 | Luo | |
| 2005/0246065 A1 | 11/2005 | Richard | |
| 2006/0140510 A1 | 6/2006 | Wallace | |
| 2006/0155442 A1 | 7/2006 | Luo | |
| 2007/0107573 A1 | 5/2007 | Weusthof et al. | |
| 2007/0171037 A1* | 7/2007 | Schofield | B60C 23/00 340/438 |
| 2007/0200064 A1 | 8/2007 | Remillard | |
| 2007/0255480 A1* | 11/2007 | Southall | B60T 7/22 701/96 |
| 2008/0051957 A1* | 2/2008 | Breed | B60R 21/01552 701/36 |
| 2008/0055411 A1* | 3/2008 | Lee | B60R 1/00 348/148 |
| 2008/0304705 A1* | 12/2008 | Pomerleau | B60R 1/00 382/103 |
| 2009/0153665 A1* | 6/2009 | Linsenmaier | B60R 1/007 348/149 |
| 2010/0013615 A1 | 1/2010 | Herbert et al. | |
| 2010/0110192 A1 | 5/2010 | Johnston | |
| 2010/0194890 A1 | 8/2010 | Weller | |
| 2010/0208034 A1 | 8/2010 | Chen | |
| 2010/0231715 A1* | 9/2010 | Garner | B60R 1/00 348/148 |
| 2010/0283837 A1* | 11/2010 | Oohchida | G06T 7/0075 348/47 |
| 2011/0234802 A1* | 9/2011 | Yamada | B60R 1/00 348/148 |
| 2011/0301786 A1 | 12/2011 | Allis | |
| 2011/0317993 A1 | 12/2011 | Weissler | |
| 2012/0083960 A1* | 4/2012 | Zhu | G05D 1/0214 701/23 |
| 2012/0293660 A1* | 11/2012 | Murakami | B60R 1/00 348/148 |
| 2013/0041508 A1 | 2/2013 | Hu et al. | |
| 2013/0156336 A1* | 6/2013 | Suk | G06T 3/0068 382/255 |
| 2013/0197736 A1* | 8/2013 | Zhu | G05D 1/0088 701/26 |
| 2013/0314503 A1* | 11/2013 | Nix | G06K 9/00805 348/46 |
| 2014/0063233 A1* | 3/2014 | Henion | B60R 1/003 348/118 |
| 2014/0071278 A1* | 3/2014 | Assaf | B60R 1/12 348/148 |
| 2014/0088855 A1* | 3/2014 | Ferguson | G08G 1/166 701/117 |
| 2014/0139669 A1* | 5/2014 | Petrillo | B60R 1/00 348/148 |
| 2014/0285666 A1* | 9/2014 | O'Connell | B60R 1/00 348/148 |
| 2014/0297116 A1* | 10/2014 | Anderson | H02K 5/12 701/37 |
| 2014/0327775 A1* | 11/2014 | Cho | H04N 5/23216 348/148 |
| 2014/0347440 A1* | 11/2014 | Hatcher | B60R 11/04 348/36 |
| 2014/0376119 A1* | 12/2014 | Sobecki | B60R 1/074 359/841 |
| 2015/0109415 A1* | 4/2015 | Son | G01B 11/22 348/46 |
| 2015/0253775 A1* | 9/2015 | Jacobus | G05D 1/024 701/23 |
| 2015/0269737 A1* | 9/2015 | Lam | H04N 13/0011 382/154 |
| 2015/0358540 A1* | 12/2015 | Kanter | G08G 1/168 348/38 |
| 2016/0129838 A1* | 5/2016 | Mingo | B60R 1/00 382/104 |
| 2016/0132705 A1* | 5/2016 | Kovarik | G06K 7/10376 340/10.3 |
| 2016/0379411 A1* | 12/2016 | Harbach | G06F 3/147 345/633 |
| 2017/0344004 A1* | 11/2017 | Foster | G05D 1/0088 |
| 2018/0007345 A1* | 1/2018 | Bougnoux | H04N 13/0246 |
| 2018/0070804 A1 | 3/2018 | Tesar | |

OTHER PUBLICATIONS

First Office Action dated Dec. 15, 2016 in CN 201480022190.5.
Office Action dated Jan. 16, 2017 in CA 2,902,430.

\* cited by examiner

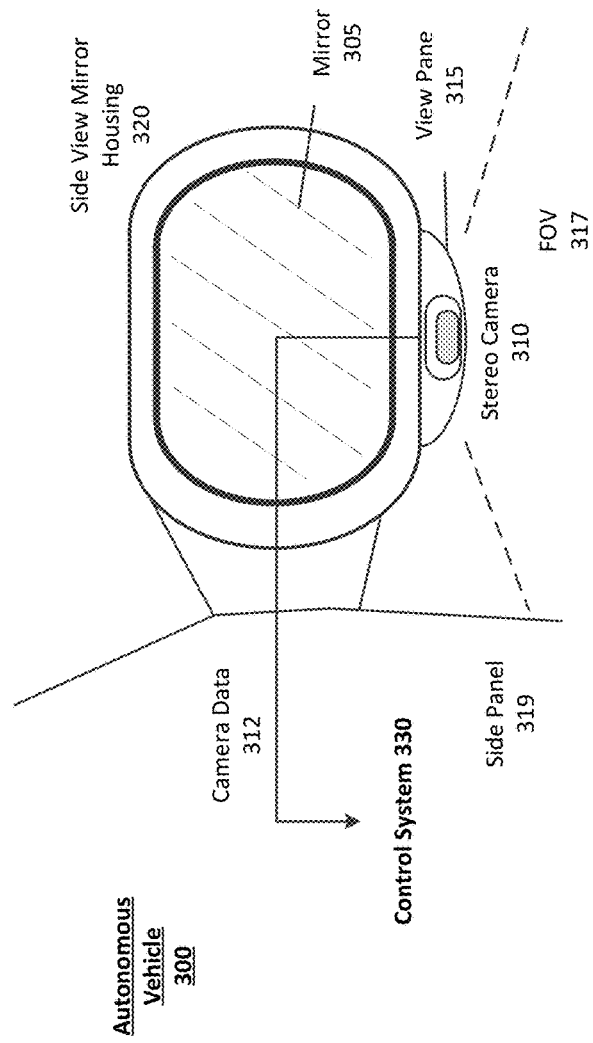
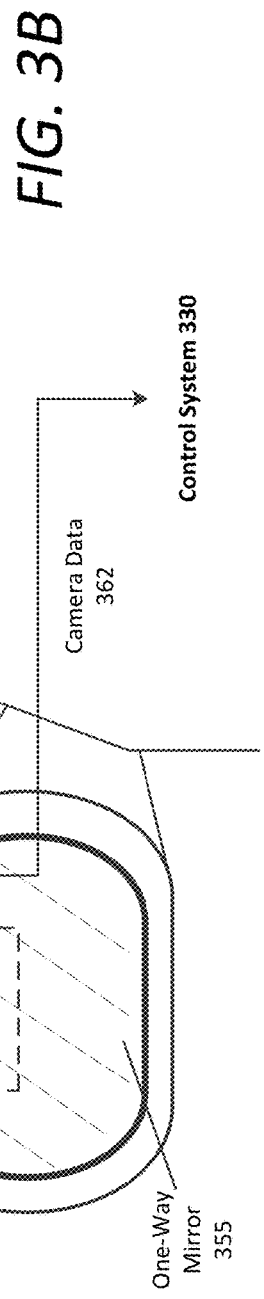
FIG. 3A
FIG. 3B

SIDEPOD STEREO CAMERA SYSTEM FOR AN AUTONOMOUS VEHICLE

BACKGROUND

Autonomous vehicles (AVs) may require continuous, or near continuous, sensor data gathering and processing in order to operate safely through real-world environments. In doing so, many AVs include sensor systems including cameras (e.g., stereoscopic cameras), among other sensor systems, to continuously monitor a situational environment as the AV travels along any given route.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 3A and 3B illustrate example stereo cameras integrated within a side-view mirror housing of an AV;

DETAILED DESCRIPTION

Figure 1:
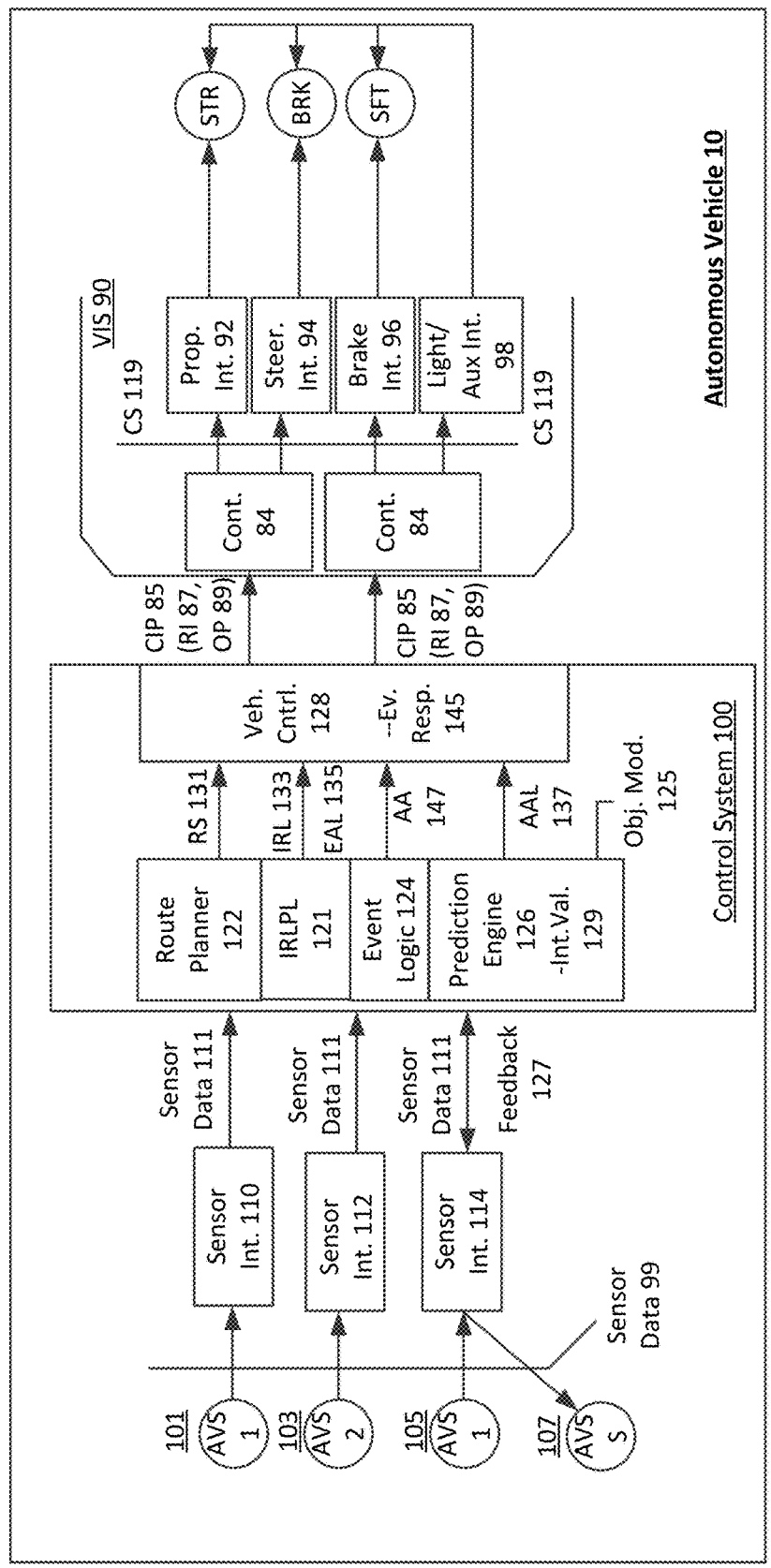
FIG. 1 shows a block diagram of a control system for operating an autonomous vehicle in accordance with example implementations.

Autonomous vehicles (AVs) (e.g., also referred to as a self-driving vehicle) can include sensor arrays for real-time detection of any potential obstacles or hazards. Such sensor arrays can include LIDAR sensors, stereoscopic cameras (or "stereo cameras"), radar, sonar, infrared sensors, and/or proximity sensors to enable a control system of the AV respond to immediate concerns, such as potential hazards, pedestrians, other vehicles, traffic signals and signs, bicyclists, and the like. Current AV sensor arrays involve roof-mounted systems to generate sensor data when the AV is traveling along a current route. Other sensors to detect potential hazards in blind spots of the sensor array include proximity sensors and/or camera systems (e.g., a rear-facing backup camera). However, detail and depth perception may be advantageous or even necessary to identify and resolve such hazards when, for example, the AV is in a stopped or high caution state.

A sidepod stereo camera system for an autonomous vehicle (AV) is described herein to, for example, overcome the deficiencies of previous proximity detection and/or warning systems. The sidepod stereo camera system can include a sidepod housing with a view pane (e.g., a glass or acrylic panel or lens) mounted to the AV. In many aspects, the AV can include a plurality of sidepod housings (e.g., one mounted to each side of the AV). As referred to herein, a sidepod housing can be a structure that extends outwards away from the side of an AV. For example, the side-view mirror housings of existing vehicles may be repurposed or otherwise reconfigured to include stereo cameras to provide camera data (including depth of field data) to an AV control system. In certain implementations, the view panes may be curved (e.g., bulbous or partially globular) to provide extensive field of view for the stereo cameras. In some examples, multiple stereo cameras may be installed in each sidepod housing, while in other examples, a single camera can be used in each sidepod housing. Additionally or alternatively, the stereo cameras can include wide-angle or fish-eye lenses to maximize field of view. In variations, the side-view mirrors of the AV can include one-way mirrors (i.e., having a transparent view direction and a reflective view direction). In such variations, a stereo camera disposed within the side-view mirror housing can have a field of view extending rearward through the one-way mirror.

In some aspects, the sidepod stereo camera system can include a controller that operates to responsively activate and deactivate the sidepod stereo camera system when certain conditions are detected. In one example, the controller is a dedicated component that monitors the AV subsystems (e.g., vehicle speed, route data, etc.) to determine whether to activate or deactivate the sidepod stereo camera system. Additionally or alternatively, the sidepod stereo camera system may be operated by a control system of the AV, where the control system also autonomously operates the AV's acceleration, braking, steering, and auxiliary systems (e.g., lights and signals) to actively drive the AV to a particular inputted destination. According to examples described herein, the controller or AV control system can activate the sidepod stereo camera system when the AV starts up. Thus, the sidepod stereo camera system can provide camera data to the AV control system for monitoring when, for example, the control system autonomously performs an egress maneuver from a parked state or a stopped/stationary state. In certain implementations, the sidepod stereo camera system can deactivate after the AV performs the egress maneuver and/or when the AV accelerates above a threshold speed.

Additionally or alternatively, the sidepod stereo camera system can activate and deactivate based on high caution conditions and/or based on the speed of the AV. For example, high caution situations may arise whenever the AV encounters an intersection, a crowded area, a crosswalk, a bicycle lane, a road having proximate parallel parked vehicles, and the like. When the AV control system detects such situations and features, the stereo camera system can activate to provide camera data to the AV control system, or on-board data processing system, accordingly. Additionally or alternatively, the sidepod stereo camera system may automatically activate and deactivate when a threshold speed is reached (e.g., 5 miles per hour). For example, as the AV approaches an intersection and decelerates below a first threshold, the stereo camera system can automatically activate. When the AV accelerates through the intersection and above a second threshold, the stereo camera system can deactivate.

Among other benefits, the examples described herein achieve a technical effect of providing additional camera data to prevent potential incidents when, for example, the AV is performing low speed and compact maneuvering. In many examples, the camera data can originate from one or more stereo cameras and thus provide depth of field information in order to detect a position of a potential hazard, identify the hazard, maneuver around the hazard, and/or resolve the hazard.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV). An AV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs drive without any human assistance from within or external to the vehicle. Such vehicles often are required to make advance determinations regarding how the vehicle is behave given challenging surroundings of the vehicle environment.

System Description

FIG. 1 shows a block diagram illustrating an AV in accordance with example implementations. In an example of FIG. 1, a control system 100 can be used to autonomously operate an AV 10 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake and operate lighting components. Some variations also recognize that an autonomous-capable vehicle can be operated either autonomously or manually.

In one implementation, the control system 100 can utilize specific sensor resources in order to intelligently operate the vehicle 10 in most common driving situations. For example, the control system 100 can operate the vehicle 10 by autonomously steering, accelerating, and braking the vehicle 10 as the vehicle progresses to a destination. The control system 100 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 100 includes a computer or processing system which operates to process sensor data that is obtained on the vehicle with respect to a road segment upon which the vehicle 10 operates. The sensor data can be used to determine actions which are to be performed by the vehicle 10 in order for the vehicle 10 to continue on a route to a destination. In some variations, the control system 100 can include other functionality, such as wireless communication capabilities, to send and/or receive wireless communications with one or more remote sources. In controlling the vehicle 10, the control system 100 can issue instructions and data, shown as commands 85, which programmatically controls various electromechanical interfaces of the vehicle 10. The commands 85 can serve to control operational aspects of the vehicle 10, including propulsion, braking, steering, and auxiliary behavior (e.g., turning lights on).

Examples recognize that urban driving environments present significant challenges to autonomous vehicles. In particular, the behavior of objects such as pedestrians, bicycles, and other vehicles can vary based on geographic region (e.g., country or city) and locality (e.g., location within a city). Moreover, the manner in which other drivers respond to pedestrians, bicyclists and other vehicles varies by geographic region and locality.

Accordingly, examples provided herein recognize that the effectiveness of autonomous vehicles in urban settings can be limited by the limitations of autonomous vehicles in recognizing and understanding how to handle the numerous daily events of a congested environment. In particular, examples described recognize that contextual information can enable autonomous vehicles to understand and predict events, such as the likelihood that an object will collide or interfere with the autonomous vehicle. While in one geographic region, an event associated with an object (e.g., fast moving bicycle) can present a threat or concern for collision, in another geographic region, the same event can be deemed more common and harmless. Accordingly, examples are described which process sensor information to detect objects and determine object type, and further to determine contextual information about the object, the surroundings, and the geographic region, for purpose of making predictive determinations as to the threat or concern which is raised by the presence of the object near the path of the vehicle.

The AV 10 can be equipped with multiple types of sensors 101, 103, 105, which combine to provide a computerized perception of the space and environment surrounding the vehicle 10. Likewise, the control system 100 can operate within the AV 10 to receive sensor data from the collection of sensors 101, 103, 105, and to control various electromechanical interfaces for operating the vehicle on roadways.

In more detail, the sensors 101, 103, 105 operate to collectively obtain a complete sensor view of the vehicle 10, and further to obtain situational information proximate to the vehicle 10, including any potential hazards in a forward operational direction of the vehicle 10. By way of example, the sensors 101, 103, 105 can include multiple sets of cameras sensors 101 (video camera, stereoscopic pairs of cameras or depth perception cameras, long range cameras), remote detection sensors 103 such as provided by radar or LIDAR, proximity or touch sensors 105, and/or sonar sensors (not shown).

Each of the sensors 101, 103, 105 can communicate with the control system 100 utilizing a corresponding sensor interface 110, 112, 114. Each of the sensor interfaces 110, 112, 114 can include, for example, hardware and/or other logical component which is coupled or otherwise provided with the respective sensor. For example, the sensors 101, 103, 105 can include a video camera and/or stereoscopic camera set which continually generates image data of an environment of the vehicle 10. As an addition or alternative, the sensor interfaces 110, 112, 114 can include a dedicated processing resource, such as provided with a field programmable gate array ("FPGA") which can, for example, receive and/or process raw image data from the camera sensor.

In some examples, the sensor interfaces 110, 112, 114 can include logic, such as provided with hardware and/or programming, to process sensor data 99 from a respective sensor 101, 103, 105. The processed sensor data 99 can be outputted as sensor data 111. As an addition or variation, the control system 100 can also include logic for processing raw or pre-processed sensor data 99.

According to one implementation, the vehicle interface subsystem 90 can include or control multiple interfaces to control mechanisms of the vehicle 10. The vehicle interface subsystem 90 can include a propulsion interface 92 to electrically (or through programming) control a propulsion component (e.g., an accelerator pedal), a steering interface 94 for a steering mechanism, a braking interface 96 for a braking component, and a lighting/auxiliary interface 98 for exterior lights of the vehicle. The vehicle interface subsystem 90 and/or the control system 100 can include one or more controllers 84 which can receive one or more commands 85 from the control system 100. The commands 85 can include route information 87 and one or more operational parameters 89 which specify an operational state of the vehicle 10 (e.g., desired speed and pose, acceleration, etc.).

The controller(s) 84 can generate control signals 119 in response to receiving the commands 85 for one or more of the vehicle interfaces 92, 94, 96, 98. The controllers 84 can use the commands 85 as input to control propulsion, steering, braking, and/or other vehicle behavior while the AV 10 follows a current route. Thus, while the vehicle 10 is actively drive along the current route, the controller(s) 84 can continuously adjust and alter the movement of the vehicle 10 in response to receiving a corresponding set of commands 85 from the control system 100. Absent events or conditions which affect the confidence of the vehicle 10 in safely progressing along the route, the control system 100 can generate additional commands 85 from which the controller(s) 84 can generate various vehicle control signals 119 for the different interfaces of the vehicle interface subsystem 90.

According to examples, the commands 85 can specify actions to be performed by the vehicle 10. The actions can correlate to one or multiple vehicle control mechanisms (e.g., steering mechanism, brakes, etc.). The commands 85 can specify the actions, along with attributes such as magnitude, duration, directionality, or other operational characteristic of the vehicle 10. By way of example, the commands 85 generated from the control system 100 can specify a relative location of a road segment which the AV 10 is to occupy while in motion (e.g., change lanes, move into a center divider or towards shoulder, turn vehicle, etc.). As other examples, the commands 85 can specify a speed, a change in acceleration (or deceleration) from braking or accelerating, a turning action, or a state change of exterior lighting or other components. The controllers 84 can translate the commands 85 into control signals 119 for a corresponding interface of the vehicle interface subsystem 90. The control signals 119 can take the form of electrical signals which correlate to the specified vehicle action by virtue of electrical characteristics that have attributes for magnitude, duration, frequency or pulse, or other electrical characteristics.

In an example of FIG. 1, the control system 100 can include a route planner 122, event logic 124, prediction engine 126, and a vehicle control 128. The vehicle control 128 represents logic that converts alerts of event logic 124 ("event alert 135") and prediction engine 126 ("anticipatory alert 137") into commands 85 that specify a vehicle action or set of actions.

Additionally, the route planner 122 can select one or more route segments that collectively form a path of travel for the AV 10 when the vehicle 10 is on a current trip (e.g., servicing a pick-up request). In one implementation, the route planner 122 can specify route segments 131 of a planned vehicle path which defines turn by turn directions for the vehicle 10 at any given time during the trip. The route planner 122 may utilize the sensor interface 110 to receive GPS information as sensor data 111. The vehicle control 128 can process route updates from the route planner 122 as commands 85 to progress along a path or route using default driving rules and actions (e.g., moderate steering and speed).

In some examples, the control system 100 can also include intra-road segment localization and positioning logic ("IRLPL 121"). The IRLPL 121 can utilize sensor data 111 in the form of LIDAR, stereoscopic imagery, and/or depth sensors. While the route planner 122 can determine the road segments of a road path along which the vehicle 10 operates, IRLPL 121 can identify an intra-road segment location 133 for the vehicle 10 within a particular road segment. The intra-road segment location 133 can include contextual information, such as marking points of an approaching roadway where potential ingress into the roadway (and thus path of the vehicle 10) may exist. The intra-road segment location 133 can be utilized by the event logic 124, the prediction engine 126, and/or the vehicle control 128, for the purpose of detecting potential points of interference or collision on the portion of the road segment in front of the vehicle 10. The intra-road segment location 133 can also be used to determine whether detected objects can collide or interfere with the vehicle 10, and further to determine response actions for anticipated or detected events.

With respect to an example of FIG. 1, the event logic 124 can trigger a response to a detected event. A detected event can correspond to a roadway condition or obstacle which, when detected, poses a potential hazard or threat of collision to the vehicle 10. By way of example, a detected event can include an object in the road segment, heavy traffic ahead, and/or wetness or other environmental conditions on the road segment. The event logic 124 can use sensor data 111 from cameras, LIDAR, radar, sonar, or various other image or sensor component sets in order to detect the presence of such events as described. For example, the event logic 124 can detect potholes, debris, objects projected to be on a collision trajectory, and the like. Thus, the event logic 124 can detect events which enable the control system 100 to make evasive actions or plan for any potential threats.

When events are detected, the event logic 124 can signal an event alert 135 that classifies the event and indicates the type of avoidance action to be performed. For example, an event can be scored or classified between a range of likely harmless (e.g., small debris in roadway) to very harmful (e.g., vehicle crash may be imminent). In turn, the vehicle control 128 can determine a response based on the score or classification. Such response can correspond to an event avoidance action 145, or an action that the vehicle 10 can perform to maneuver the vehicle 10 based on the detected event and its score or classification. By way of example, the vehicle response can include a slight or sharp vehicle maneuvering for avoidance using a steering control mechanism and/or braking component. The event avoidance action 145 can be signaled through the commands 85 for controllers 84 of the vehicle interface subsystem 90.

The prediction engine 126 can operate to anticipate events that are uncertain to occur, but would likely interfere with the progress of the vehicle on the road segment should such events occur. The prediction engine 126 can utilize the same or similar sensor information 111 as used by the event logic 124. The prediction engine 126 can also determine or utilize contextual information that can also be determined from further processing of the sensor data 111, and/or information about a traversed road segment from a road network. Thus, in some examples, the control system 100 can use a common set of sensor data 111 for use in implementing event logic 124 and the prediction engine 126.

According to some examples, the prediction engine 126 can process a combination or subset of the sensor data 111 in order to determine an interference value 129 (shown as "IV 129") which reflects a probability that an object of a particular type (e.g., pedestrian, child, bicyclist, skateboarder, small animal, etc.) will move into a path of collision or interference with the vehicle 10 at a particular point or set of points of the roadway. The prediction engine 126 can utilize the road segment 131 and intra-road segment location 133 to determine individual points of a portion of an upcoming road segment where a detected or occluded object can ingress into the path of travel. The interference value 129 can incorporate multiple parameters or values, so as to reflect information such as (i) a potential collision zone relative to the vehicle, (ii) a time when collision or interference may occur (e.g., 1-2 seconds), (iii) a likelihood or probability that such as event would occur (e.g., "low" or "moderate"), and/or (iv) a score or classification reflecting a potential magnitude of the collision or interference (e.g., "minor," "moderate," or "serious").

As described with some examples, the interference value 129 can be determined at least in part from predictive object models 125, which can be tuned or otherwise weighted for the specific geographic region and/or locality. The predictive object models 125 can predict a probability of a particular motion by an object (such as into the path of the vehicle 10), given, for example, a position and pose of the object, as well as information about a movement (e.g., speed or direction) of the object. The use of predictive object models, such as described with an example of FIG. 1 and elsewhere, can accommodate variations in behavior and object propensity amongst geographic regions and localities. For example, in urban environments which support bicycle messengers, erratic or fast moving bicycles can be weighed against a potential collision with the vehicle 10 (despite proximity and velocity data which would momentarily indicate otherwise—as compared to other environments where bicycle riding is more structured—because the behavior of bicyclists in the urban environment may be associated with intentional actions.

With respect to detected objects, in some implementations, the prediction engine 126 can detect and classify objects which are on or near the roadway and which can potentially ingress into the path of travel so as to interfere or collide with the AV 10. The detected objects can be off of the road (e.g., on sidewalk, etc.) or on the road (e.g., on shoulder or on an opposite lane of the road). In addition to detecting and classifying the object, the prediction engine 126 can utilize contextual information for the object and its surroundings to predict a probability that the object will interfere or collide with vehicle 10. The contextual information can include determining the object position relative to the path of the vehicle 10 and/or pose relative to a point of ingress with the path of the AV 10. As an addition or alternative, the contextual information can also identify one or more characteristics of the object's motion, such as a direction of movement, a velocity, or acceleration. As described with other examples, the detected object, as well as the contextual information, can be used to determine the interference value 129. In some examples, the interference value 129 for a detected object can be based on (i) the type of object, (ii) the pose of the object, (iii) a position of the object relative to the vehicle's path of travel, and/or (iv) aspects or characteristics of the detected object's motion (such as direction and/or speed).

With respect to undetected or occluded objects, in some implementations, the prediction engine 126 can determine potential points of ingress into the planned path of travel for the vehicle 10. The prediction engine 126 can acquire roadway information about an upcoming road segment from, for example, the route planner 122 in order to determine potential points of ingress. The potential points of ingress can correlate to, for example, (i) spatial intervals extending along a curb that separates a sidewalk and road, (ii) spatial intervals of a parking lane or shoulder extending with the road segment, and/or (iii) an intersection. In some implementations, the prediction engine 126 processes the sensor data 111 to determine if the road segment (e.g., the spatial interval(s) of an intersection) is occluded.

When occlusion exists, the prediction engine 126 can determine the interference value 129 for an unseen or undetected object. As described with other examples, the determinations of the interference values 129 for both detected and undetected (or occluded objects) can be weighted to reflect geographic or locality specific characteristics in the behavior of objects or the propensity of such objects to be present.

Additionally or alternatively, when persistent occlusions are of imminent concern (e.g., blind spots when changing lanes or when the AV 10 is stationary), the prediction engine 126 can provide feedback 127 to the sensor interface 114 in order to activate one or more additional sensor systems. As described herein, the feedback 127 can initiate an additional sensor 107, which can correspond to a sidepod stereo camera system that provides camera data with depth range to further enable the control system 100 to detect and identify potential hazards. In variations, the sensor 107 can be deactivated when the control system 100 no longer requires analysis of the persistent occlusions. For example, after the AV 10 reaches a certain threshold speed (e.g., 5 miles per hour), sensors 101, 103, 105 can detect oncoming hazards in advance that may render the additional sensor 107 (e.g., the sidepod stereo camera system) of minimal use. Thus, the control system 100 can automatically deactivate the additional sensor 107 when certain conditions are met (e.g., the AV 10 exceeds a certain speed, or completes an egress maneuver from a parked state).

In some examples, the interference value 129 can include multiple dimensions, to reflect (i) an indication of probability of occurrence, (ii) an indication of magnitude (e.g., by category such as "severe" or "mild"), (iii) a vehicle zone of interference or collision, and/or (iv) a time to interference or collision. A detected or undetected object can include multiple interference values 129 to reflect one or multiple points of interference/collision with the vehicle, such as multiple collision zones from one impact, or alternative impact zones with variable probabilities. The prediction engine 126 can use models, statistical analysis or other computational processes in determining a likelihood or probability (represented by the likelihood of interference value 129) that the detected object will collide with the vehicle 10 or interfere with the planned path of travel. The likelihood of interference value 129 can be specific to the type of object, as well as to the geographic region and/or locality of the vehicle 10.

In some examples, the prediction engine 126 can evaluate the interference value 129 associated with individual points of ingress of the roadway in order to determine whether an anticipatory alert 137 is to be signaled. The prediction engine 126 can compare the interference value 129 to a threshold and then signal the anticipatory alert 137 when the threshold is met. The threshold and/or interference value 129 can be determined in part from the object type, so that the interference value 129 can reflect potential harm to the vehicle or to humans, as well as probability of occurrence. The anticipatory alert 137 can identify or be based on the interference value 129, as well as other information such as whether the object is detected or occluded, as well as the type of object that is detected. The vehicle control 128 can alter control of the vehicle 10 in response to receiving the anticipatory alert 137.

In some examples, the prediction engine 126 can determine possible events relating to different types or classes of dynamic objects, such as other vehicles, bicyclists, or pedestrians. In examples described, the interference value 129 can be calculated to determine which detected or undetected objects should be anticipated through changes in the vehicle operation. For example, when the vehicle 10 drives at moderate speed down a roadway, the prediction engine 126 can anticipate a sudden pedestrian encounter as negligible. When however, contextual information from the route planner 122 indicates the road segment has a high likelihood of children (e.g., a school zone), the prediction engine 126 can significantly raise the interference value 129 whenever a portion of the side of the roadway is occluded (e.g., by a parked car). When the interference value 129 reaches a threshold probability, the prediction engine 126 can signal the anticipatory alert 137. In variations, the prediction engine 126 can communicate a greater percentage of anticipatory alerts 137 if the anticipatory action 147 is negligible and the reduction in probability is significant. For example, if the threat of occluded pedestrians is relatively small but the chance of collision can be eliminated for points of ingress that are more than two car lengths ahead with only a slight reduction in velocity, then under this example, the anticipatory alert 137 can be used by the vehicle control 128 to reduce the vehicle velocity, thereby reducing the threat range of an ingress by an occluded pedestrian to points that are only one car length ahead of the vehicle 10.

In some examples, the prediction engine 126 can detect the presence of dynamic objects by class, as well as contextual information about each of the detected objects—such as speed, relative location, possible point of interference (or zone of collision), pose, and direction of movement. Based on the detected object type and the contextual information, the prediction engine 126 can signal an anticipatory alert 137 which can indicate information such as (i) a potential collision zone (e.g., front right quadrant 20 feet in front of vehicle), (ii) a time when collision or interference may occur (e.g., 1-2 seconds), (iii) a likelihood or probability that such an event would occur (e.g., "low" or "moderate"), and/or (iv) a score or classification reflecting a potential magnitude of the collision or interference (e.g., "minor", "moderate" or "serious"). The vehicle control 128 can respond to the anticipatory alert 137 by determining an anticipatory action 147 for the vehicle 10. The anticipatory action 147 can include (i) slowing the vehicle 10 down, (ii) moving the lane position of the vehicle away from the bike lane, and/or (iii) breaking a default or established driving rule such as enabling the vehicle 10 to drift past the center line. The magnitude and type of anticipatory action 147 can be based on factors such as the probability or likelihood score, as well as the school or classification of potential harm resulting from the anticipated interference or collision.

As an example, when the AV 10 approaches bicyclists on the side of the road, examples provide that the prediction engine 126 can detect the bicyclists (e.g., using LIDAR or stereoscopic cameras) and then determine an interference value 129 for the bicyclist. Among other information which can be correlated with the interference value 129, the prediction engine 126 can determine a potential zone of collision based on direction, velocity, and other characteristics in the movement of the bicycle. The prediction engine 126 can also obtain and utilize contextual information about the detected object from corresponding sensor data 111 (e.g., image capture of the detected object, to indicate pose etc.), as well as intra-road segment location 133 of the road network (e.g., using information route planner 122). The sensor detected contextual information about a dynamic object can include, for example, speed and pose of the object, direction of movement, presence of other dynamic objects, and other information. For example, when the prediction engine 126 detects a bicycle, the interference value 129 can be based on factors such as proximity, orientation of the bicycle, and speed of the bicycle. The interference value 129 can indicate whether the anticipatory alert 137 is signaled. The vehicle control 128 can use information provided with the interference value to determine the anticipatory action 147 that is to be performed.

When an anticipated dynamic object of a particular class does in fact move into position of likely collision or interference, some examples provide that event logic 124 can signal the event alert 135 to cause the vehicle control 128 to generate commands that correspond to an event avoidance action 145. For example, in the event of a bicycle crash in which the bicycle (or bicyclist) falls into the path of the vehicle 10, event logic 124 can signal the event alert 135 to avoid the collision. The event alert 135 can indicate (i) a classification of the event (e.g., "serious" and/or "immediate"), (ii) information about the event, such as the type of object that generated the event alert 135, and/or information indicating a type of action the vehicle 10 should take (e.g., location of object relative to path of vehicle, size or type of object, etc.).

The vehicle control 128 can use information provided with the event alert 135 to perform an event avoidance action 145 in response to the event alert 135. Because of the preceding anticipatory alert 137 and the anticipatory action 147 (e.g., the vehicle slows down), the vehicle 10 can much more readily avoid the collision. The anticipatory action 147 is thus performed without the bicyclists actually interfering with the path of the vehicle. However, because an anticipatory action 147 is performed, in the event that the detected object suddenly falls into a path of collision or interference, the vehicle control logic 128 has more time to respond to the event alert 135 with an event avoidance action 145, as compared to not having first signaled the anticipatory alert 137.

Numerous other examples can also be anticipated using the control system 100. For dynamic objects corresponding to bicyclists, pedestrians, encroaching vehicles or other objects, the prediction engine 126 can perform the further processing of sensor data 111 to determine contextual information about the detected object, including direction of travel, approximate speed, roadway condition, and/or location of object(s) relative to the vehicle 10 in the road segment. For dynamic objects corresponding to pedestrians, the prediction engine 126 can use, for example, (i) road network information to identify crosswalks, (ii) location specific geographic models identify informal crossing points for pedestrians, (iii) region or locality specific tendencies of pedestrians to cross the roadway at a particular location when vehicles are in motion on that roadway (e.g., is a pedestrian likely to 'jaywalk'), (iv) proximity of the pedestrian to the road segment, (v) determination of pedestrian pose relative to the roadway, and/or (vi) detectable visual indicators of a pedestrian's next action (e.g., pedestrian has turned towards the road segment while standing on the sidewalk).

For dynamic objects such as bicyclists, the prediction engine 126 can use, for example, (i) road network information to define bike paths or bike lanes alongside the roadway, (ii) location specific geographic models identify informal bike paths and/or high traffic bicycle crossing points, (iii) proximity of the pedestrian to the road segment, (iv) determination of bicyclist speed or pose (e.g., orientation and direction of travel), and/or (v) detectable visual indicators of the bicyclist's next action (e.g., cyclist makes a hand signal to turn in a particular direction).

Still further, for other vehicles, the prediction engine 126 can anticipate movement that crosses the path of the autonomous vehicle at locations such as stop-signed intersections. While right-of-way driving rules may provide for the first vehicle to arrive at the intersection to have the right of way, examples recognize that the behavior of vehicles at rights-of-way can sometimes be more accurately anticipated based on geographic region. For example, certain localities tend to have aggressive drivers as compared to other localities. In such localities, the control system 100 for the vehicle 10 can detect the arrival of a vehicle at a stop sign after the arrival of the AV 10. Despite the late arrival, the control system 100 may watch for indications that the late arriving vehicle is likely to forego right-of-way rules and enter into the intersection as the first vehicle. These indicators can include, for example, arrival speed of the other vehicle at the intersection, braking distance, minimum speed reached by other vehicle before stop sign, etc.

Figure 2:
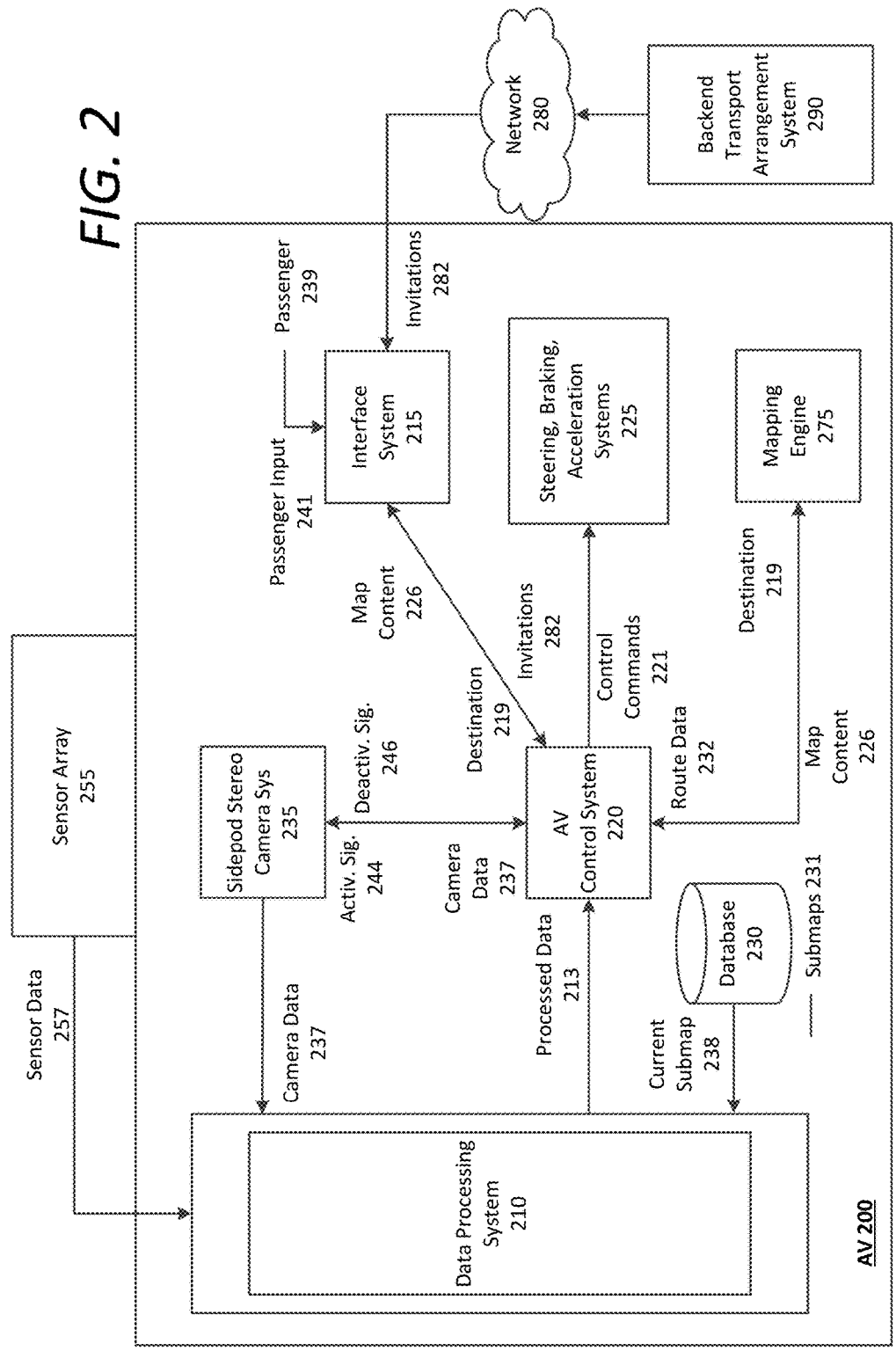
FIG. 2 is a block diagram illustrating an example autonomous vehicle including a sidepod stereo camera system, as described herein.

FIG. 2 is a block diagram illustrating an example autonomous vehicle including a sidepod stereo camera system, as described herein. The AV 200 shown in FIG. 2 can include some or all aspects and functionality of the autonomous vehicle 10 described with respect to FIG. 1. Referring to FIG. 2, the AV 200 can include a sensor array 255 that can provide sensor data 257 to an on-board data processing system 210. As described herein, the sensor array 255 can include any number of active or passive sensors that continuously detect a situational environment of the AV 200. For example, the sensor array 255 can include a number of camera sensors (e.g., stereo cameras), LIDAR sensor(s), proximity sensors, radar, and the like. The data processing system 210 can utilize the sensor data 257 to detect the situational conditions of the AV 200 as the AV 200 travels along a current route. For example, the data processing system 210 can identify potential obstacles or road hazards—such as pedestrians, bicyclists, objects on the road, road cones, road signs, animals, etc.—in order to enable an AV control system 220 to react accordingly.

In certain implementations, the data processing system 210 can utilize sub-maps 231 stored in a database 230 of the AV 200 (or accessed remotely from the backend system 290 via the network 280) in order to perform localization and pose operations to determine a current location and orientation of the AV 200 in relation to a given region (e.g., a city).

The data sub-maps 231 in the database 230 can comprise previously recorded sensor data, such as stereo camera data, radar maps, and/or point cloud LIDAR maps. The sub-maps 231 can enable the data processing system 210 to compare the sensor data 257 from the sensor array 255 with a current sub-map 238 to identify obstacles and potential road hazards in real time. The data processing system 210 can provide the processed sensor data 213—identifying such obstacles and road hazards—to the AV control system 220, which can react accordingly by operating the steering, braking, and acceleration systems 225 of the AV 200 to perform low level maneuvering.

In many implementations, the AV control system 220 can receive a destination 219 from, for example, an interface system 215 of the AV 200. The interface system 215 can include any number of touch-screens, voice sensors, mapping resources, etc. that enable a passenger 239 to provide a passenger input 241 indicating the destination 219. For example, the passenger 239 can type the destination 219 into a mapping engine 275 of the AV 200, or can speak the destination 219 into the interface system 215. Additionally or alternatively, the interface system 215 can include a wireless communication module that can connect the AV 200 to a network 280 to communicate with a backend transport arrangement system 290 to receive invitations 282 to service a pick-up or drop-off request. Such invitations 282 can include destination 219 (e.g., a pick-up location), and can be received by the AV 200 as a communication over the network 280 from the backend transport arrangement system 290. In many aspects, the backend transport arrangement system 290 can manage routes and/or facilitate transportation for users using a fleet of autonomous vehicles throughout a given region. The backend transport arrangement system 290 can be operative to facilitate passenger pick-ups and drop-offs to generally service pick-up requests, facilitate delivery such as packages or food, and the like.

Based on the destination 219 (e.g., a pick-up location), the AV control system 220 can utilize the mapping engine 275 to receive route data 232 indicating a route to the destination 219. In variations, the mapping engine 275 can also generate map content 226 dynamically indicating the route traveled to the destination 219. The route data 232 and/or map content 226 can be utilized by the AV control system 220 to maneuver the AV 200 to the destination 219 along the selected route. For example, the AV control system 220 can dynamically generate control commands 221 for the autonomous vehicle's steering, braking, and acceleration system 225 to actively drive the AV 200 to the destination 219 along the selected route. Optionally, the map content 226 showing the current route traveled can be streamed to the interior interface system 215 so that the passenger(s) 239 can view the route and route progress in real time.

In many examples, while the AV control system 220 operates the steering, braking, and acceleration systems 225 along the current route on a high level, and the processed data 213 provided to the AV control system 220 can indicate low level occurrences, such as obstacles and potential hazards to which the AV control system 220 can make decisions and react. For example, the processed data 213 can indicate a pedestrian crossing the road, traffic signals, stop signs, other vehicles, road conditions, traffic conditions, bicycle lanes, crosswalks, pedestrian activity (e.g., a crowded adjacent sidewalk), and the like. The AV control system 220 can respond to the processed data 213 by generating control commands 221 to reactively operate the steering, braking, and acceleration systems 225 accordingly.

According to examples described herein, the AV 200 can include a sidepod stereo camera system 235 that can be activated by the AV control system 220 when required. The sidepod stereo camera system 235 can include a number of sidepods mounted to the AV 200, where each sidepod includes one or more stereo cameras. Examples described herein recognize that current systems may include single camera embodiments that provide image data of blind spots but do not provide depth range to objects of interest. Stereo cameras include two (or more) lenses, each including a separate image sensor to simulate binocular vision, and can thus perform range imaging. In some examples, camera data 237 from the stereo cameras situated within the sidepod housings can identify objects of interest and enable the data processing system 210 and/or the AV control system 220 to determine a distance to each of the objects of interest.

When activated, the sidepod stereo camera system 235 can provide camera data 237 from fields of view occluded from the sensor array 255. For example, the sidepod housings can be mounted on the sides of the AV 200 and can include viewing panes that provide fields of view of up to 180° with respect to each side panel of the AV 200. For AV's 200 having roof mounted sensor arrays 255, the sidepod stereo camera system 235 can eliminate significant blind spots in the proximate side-view areas of the AV 200. As provided herein, the sidepod stereo camera system 235 can be controlled by the AV control system 220, or can receive data from the control system 235 in order to self-activate and deactivate. In one example, the AV control system 220 can transmit activation signals 244 and deactivation signals 246 to the sidepod stereo camera system 235 when certain conditions are met.

In many implementations, the sidepod stereo camera system 235 can be integrated within the side-view mirror housings of the AV 200. For example, the side-view mirror housings can be retrofitted to house one or more stereo cameras, and view panes to provide the stereo cameras with respective fields of view. In one example, the view panes can comprise a partially globular or bulbous transparent panel through which the stereo camera(s) can view. In certain aspects, the stereo camera can include wide-angle or fish-eye lenses to maximize field of view. In variations the side-view mirror housings can include multiple stereo cameras each recording camera data 237 in a unique direction. Accordingly, in certain implementations, the side-view mirror housing can include two or more viewing panes for the multiple stereo cameras situated therewithin. Further description of the arrangement(s) of the sidepod stereo camera system 235 utilizing side-view mirror housings is described below with respect to FIGS. 3A and 3B.

According to certain aspects, the AV control system 220 can start-up the AV 200 in response to a passenger input 241 (e.g., an input on a start button or an ignition switch). In the start-up procedure, the AV control system 220 can transmit an activation signal 244 to activate the sidepod stereo camera system 235, which can transmit camera data 237 to the data processing system 210 and/or the AV control system 220 for analysis. The sidepod stereo camera system 235 can have a main purpose of detecting proximate objects of interest when the AV 200 is stationary or near stationary, and/or when the AV 200 performs a parking maneuver or an egress maneuver from a parked state. In some examples, the data processing system 210 can analyze the camera data 237 to determine whether any potential hazards are proximate to the AV 200. If so, the data processing system 210 can transmit processed data 213 to the AV control system 220 indicating the hazards, and the AV control system 220 can respond accordingly. In certain variations, the camera data 237 from the stereo camera system 235 can be continuously streamed to the data processing system 210 in conjunction with the sensor data 257 from the sensor array 255. In other variations, the sidepod stereo camera system 235 can be activated and deactivated conditionally, as described herein.

For example, when the AV 200 is powered up, the data processing system 210 can prioritize the camera data 237 from the sidepod stereo camera system 235 to identify potential hazards (e.g., a curb, a rock, a pedestrian, an animal, or other hazard that may be occluded from the sensor array) and determine an exact position of each hazard. The AV control system 220 can determine whether the AV 200 can be maneuvered around such hazards, and if so, can perform an egress maneuver from a parked state (e.g., exiting a parallel parking spot while avoiding the curb and other vehicles). If the AV control system 220 identifies a hazard in the camera data 237 and determines that it cannot maneuver the AV 200 to avoid the hazard, the AV control system can provide an alert either to the passenger 239 or an external alert (e.g., using a vehicle horn) to resolve the hazard. Once the detected hazard is resolved and the AV control system 220 executes the egress maneuver, the AV control system 220 can transmit a deactivation signal 246 to deactivate the sidepod stereo camera system 235.

According to some examples, the sidepod stereo camera system 235 can at least partially process the camera data 237 locally. In such examples, the sidepod stereo camera system 235 can reduce computation overhead by the data processing system 210. For example, the sidepod stereo camera system 235 can process the live camera data 237 and transmit only critical data, such as objects of interest or potential hazards, to the data processing system 210 and/or control system 220. Thus, the sidepod stereo camera system 235 can include one or more processors, central processing units (CPUs), graphics processing units (GPUs), and/or one or more field programmable gate arrays (FPGAs) that can process the camera data 237 for any such objects of interest.

In processing the camera data 237, the sidepod stereo camera system 235 can process individual images for object recognition. For example, the stereo camera(s) can enable the sidepod stereo camera system 235 to detect object distances and/or speed over multiple image frames. Accordingly, the output from the sidepod stereo camera system 235 can include only critical data indicating such objects of interest and their locations. In one example, the data outputted by the sidepod stereo camera system 235 can comprise a heat map indicating the objects of interest (e.g., in red). The objects of interest can be anything from humans, potential obstacles, a curb, lane lines, and the like.

In certain aspects, the AV control system 220 can be triggered to transmit the activation signal 244 to activate the sidepod stereo camera system 235 whenever the AV 200 stops. Additionally or alternatively, the AV control system 220 can activate the sidepod stereo camera system 235 when decelerating the AV 200 below a certain threshold speed (e.g., when approaching a traffic signal), and deactivating the sidepod stereo camera system 235 when accelerating the AV 200 above the threshold speed. In some aspects the threshold speeds for activation and deactivation can be the same (e.g., 5 miles per hour). In variations, the activation threshold can be different (e.g., lower) than the deactivation threshold.

Additionally or alternatively, the AV control system 220 can utilize the route data 232 to identify when the AV 200 is approaching the destination 219, and automatically activate the sidepod stereo camera system 235 when the AV 200 is within a predetermine distance (e.g., 100 meters) or time (e.g., 20 seconds) from the destination 219. In variations, the AV control system 220 can initiate a parking mode or passenger loading/unloading mode, and can automatically activate the sidepod stereo camera system 235 in response. Thereafter, the AV control system 220 can deactivate the sidepod stereo camera system 235 when the AV 200 is powered down.

FIGS. 3A and 3B illustrate example stereo cameras integrated within a side-view mirror housing of an AV. In the examples described with respect to FIGS. 3A and 3B, the side-view mirror housing 320 can be a pre-manufactured component of the AV 300, or can be retrofitted post-manufacture. Referring to FIG. 3A, the side-view mirror housing 320 of the AV 300 can include a standard mirror 305 to provide a passenger with a rearward view of the AV 300. The side-view mirror housing 320 can further include a view pane 315. A stereo camera 310 can be situated within the side-view mirror housing 320 with a field of view 317 extending through the view pane 315. The stereo camera 310 can record camera data 312 when activated, which can be monitored and analyzed by a control system 330 of the AV 300, as described herein.

The view pane 315 can comprise glass or a transparent composite or thermoplastic. In the example shown in FIG. 3A, the view pane 315 is partially globular and faces downward to provide the stereo camera 310 with up to a 180° field of view with respect to the side panel 319 of the AV 300, and at least a 180° field of view with respect to the horizontal plane parallel to an underlying surface of the AV 300 (e.g., the road). In certain aspects, the stereo camera 310 can include wide-angled or fish-eye lenses to increase the field of view 317. In variations, the side-view mirror housing can include a pair of stereo cameras 310 that record camera data 312 in multiple directions.

In some aspects, a controller can operate an actuator of the stereo camera 310 to pan the stereo camera 310. For example, in conditions of poor visibility or if an obstruction exists in the field of view 317, the controller can pan the stereo camera 310 to attempt to resolve the condition.

Referring to FIG. 3B, the side-view mirror housing 320 can include a one-way mirror such that a rearward facing stereo camera 360 can record camera data 362 through the one-way mirror 355 while a passenger can still utilize the one-way mirror 355 for rear viewing purposes. In variations, the side view mirror housing 320 can include a standard mirror 305 with a one-way mirror portion 357 through which the stereo camera 360 records the camera data 362. In certain implementations, the side-view mirror housing 320 can include one or both embodiments shown and described with respect to FIGS. 3A and 3B. Furthermore, as described herein, the control system 330 can activate and deactivate the stereo cameras 310, 360 on an as needed basis (e.g., when the AV 300 is below a threshold speed). Furthermore, in aspects of FIG. 3B, a controller can also operate an actuator of the stereo camera 360 to pan the stereo camera 360 within the side-view mirror housing 320.

Figure 4:
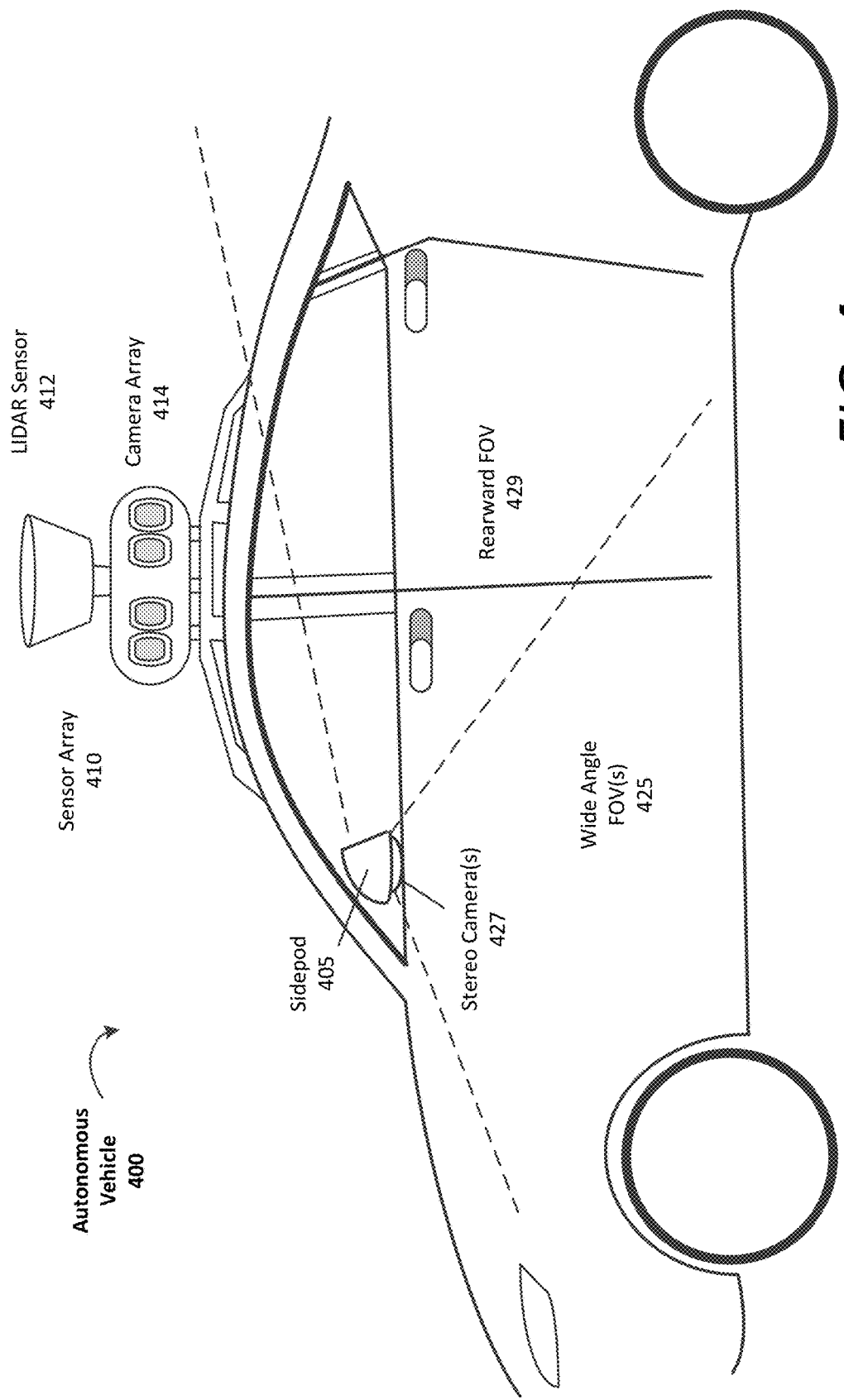
FIG. 4 illustrates an example implementation of an AV including a sidepod stereo camera system, as described herein.

FIG. 4 illustrates an example implementation of an AV including a sidepod stereo camera system, as described herein. In the example shown in FIG. 4, a side pod 405 can be customized for the AV 400 and mounted on a side panel, or can be a retrofitted side-view mirror housing. The AV 400 can include a pair of sidepods 405 (e.g., one on each of the left and right sides of the AV 400), or can include multiple stereo camera sidepods 405 on each side of the AV 400. In variations, the AV 400 can also include such sidepods 405 on other surfaces of the AV 400, such as a forward facing surface (e.g., the front bumper) or a rearward facing surface (e.g., a trunk surface). Accordingly, each stereo camera 427 in each mounted sidepod 405 can be activated and deactivated by a control system of the AV 400 as described herein.

The AV 400 can include a main sensor array 410 for autonomous driving purposes. As discussed herein, sensor data from the sensor array 410 can be processed by the control system to autonomously drive the AV 400 along a current route through typical road and pedestrian traffic. The sensor array 410 can include a LIDAR sensor 412 and a camera sensor 414, which can include any number of cameras and/or stereo cameras. In many aspects, the sensor array can be mounted to the roof of the AV 400, which can create certain blind spots in the immediate surroundings of the AV 400. Accordingly, in some implementations, the stereo camera(s) 427 within the sidepod(s) 405 can provide continuous camera data with a wide angle field of view 425 eliminating the blind spots.

When the AV 400 is traveling at speed (e.g., above 10 miles per hour), the blind spots may not be a concern since any potential hazards may be pre-detected by the sensor array 410. Accordingly, in many examples, the AV control system can activate the stereo camera(s) 427 when certain conditions are met (e.g., when the AV's speed is below a certain threshold, or when driving through dense road and/or pedestrian traffic), and deactivate the stereo camera(s) 427 when they are not needed.

In some aspects, the sidepod 405 can include a single or multiple stereo cameras 427. In one example, the sidepod 405 includes a wide angle stereo camera 427 that utilizes a partially globular, downward facing view pane that provides a wide angle field of view of the immediate surroundings of the AV 400. Additionally or alternatively, the sidepod 405 can include a rearward facing one-way mirror, and a stereo camera 427 can be included with a rearward field of view 429 extending through the one-way mirror. In certain implementations, the control system of the AV 400 can automatically activate a single stereo camera 427 (e.g., a downward wide-angle stereo camera) in the sidepod 405 when certain conditions arise (e.g., when parking the AV 400 or performing an egress maneuver from a parked state). For example, the AV control system can activate the rearward facing stereo camera 427 in the sidepod 405 only when the AV 400 is in reverse. In variations, the AV control system activates and deactivates the entire sidepod stereo camera system in unison.

As described herein, examples discussed in connection with FIGS. 1-4 recognize that side-view mirrors may become less important with the advent and continuing development of autonomous vehicle technology. As such, the position of the sidepod stereo camera(s) 427 need not be confined to any particular location on the AV 400. Rather, sidepods for the stereo camera(s) 427 can be located on a door, behind a wheel-well, on the side portion of a front or rear bumper, and/or any suitable place to view potential blind spots of the sensor array 410.

Methodology

Figure 5A:
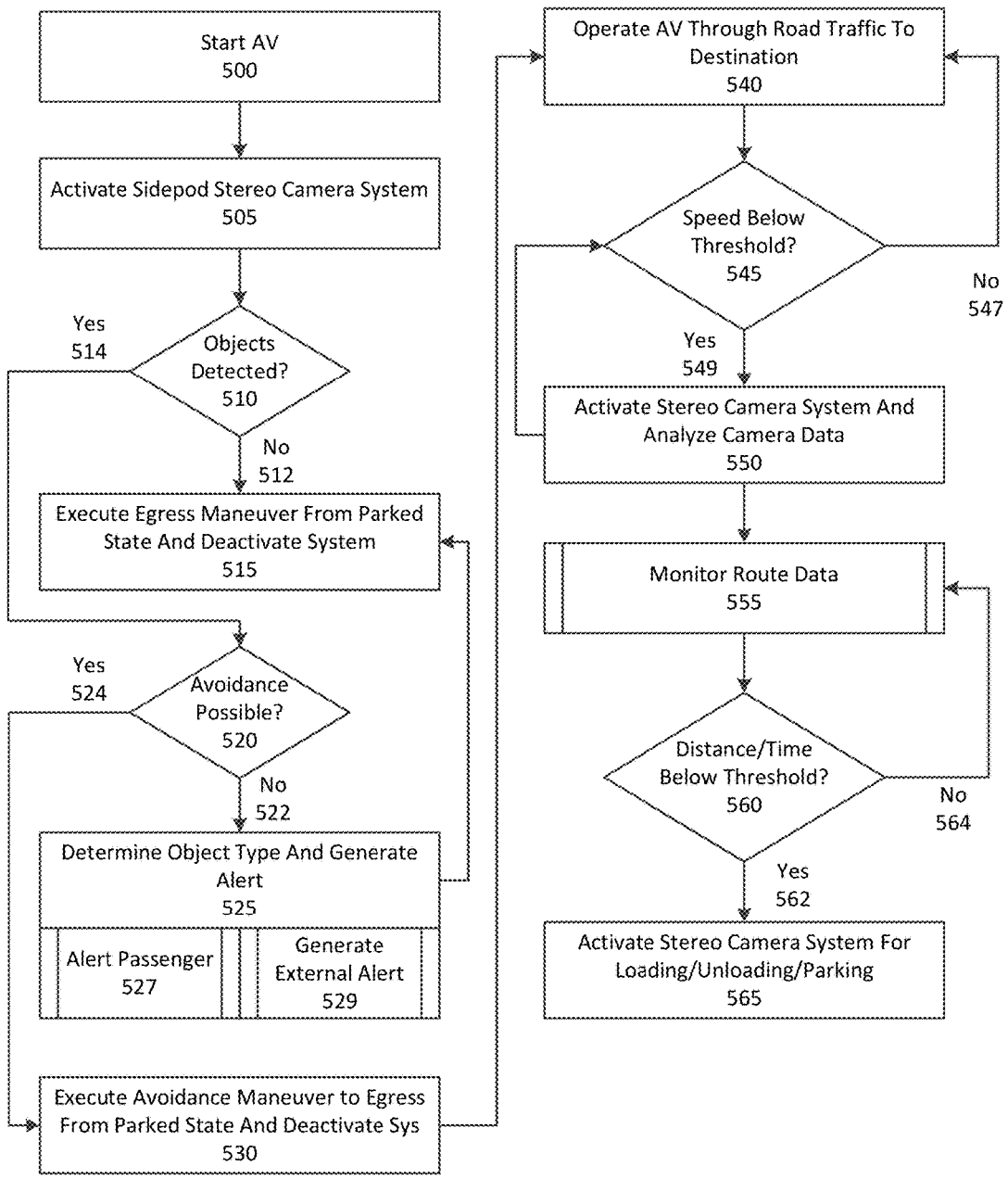
FIGS. 5A and 5B are flow charts describing example methods of operating a sidepod stereo camera system in accordance with example implementations.
Figure 5B:
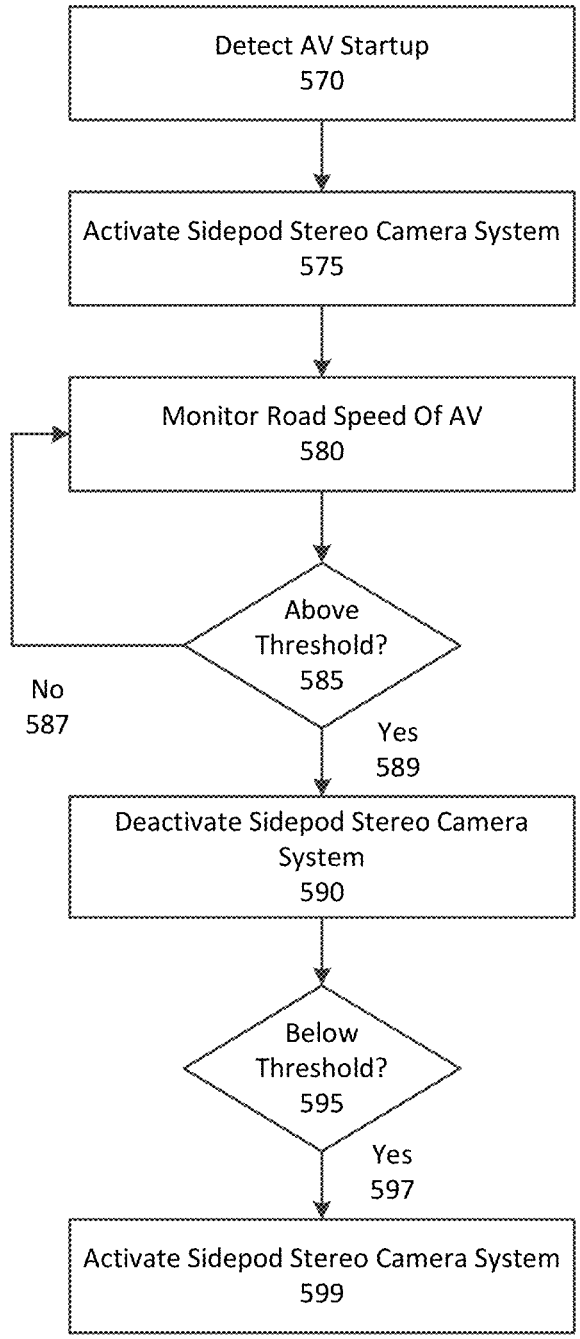

FIGS. 5A and 5B are flow charts describing example methods of operating a sidepod stereo camera system in accordance with example implementations. In the below descriptions of FIGS. 5A and 5B, reference may be made to like reference characters representing various features described with respect to FIGS. 1 through 4. Referring to FIG. 5A, the method shown and described may be performed by the AV control system 220, which can autonomously operate the steering, braking, and acceleration systems 225 of the AV 200. When a passenger 239 enters the AV 200, or when a backend transport arrangement system 290 sends an invitation 282 to the AV 200 to travel to a destination 219 (e.g., to perform a passenger pick-up), the AV control system 220 can start-up the AV 200 (500). In response to starting the AV 200, the AV control system can activate the sidepod stereo camera system 235 and analyze the camera data 237 for any objects of interest or other hazards (505).

The AV control system 220 can determine whether any objects are present in the camera data 237 (510), such as a curb, a human, an animal, debris, etc. If no objects are detected in the camera data 237 (512), then the AV control system 220 can execute an egress maneuver from a parked state and deactivate the sidepod stereo camera system 235 (515). The egress maneuver can be any maneuver to operate the AV 200 from a parked state to an autonomous road driving state. For example, the AV control system 220 can operate the AV 200 to exit a parking spot by performing a backup operation, and/or merging into traffic (e.g., parking lot traffic or road traffic). Additionally or alternatively, the egress maneuver can comprise exiting a garage (e.g., a home garage or parking garage). According to examples described herein, the AV control system 220 can deactivate the sidepod stereo camera system 235 once the AV 200 completes the egress maneuver and begins traveling to the destination 219.

However, if one or more object(s) are detected in the camera data 237 (514), then the AV control system 220 can determine whether an avoidance maneuver is possible (520) to circumvent the detected object(s). In many aspects, the AV control system 220 can determine a position and/or distance to any detected objects in the camera data 237, and determine whether the operative parameters of the AV 200 (e.g., wheelbase, turn radius, length, and width of the AV 200) enable the AV control system 220 to avoid the object(s). If avoidance is possible (524), the AV control system 220 can execute the avoidance maneuver to egress from the parked state and deactivate the sidepod stereo camera system 235 (530). However, if avoidance is not possible (522), then the AV control system can determine the object type and generate an appropriate alert (525). In some examples, the AV control system 220 can provide a notification to the passenger 239 (527) (e.g., via an alert on a display screen), so that the passenger 239 can assist in resolving the issue. For example, if the object is determined to be a piece of debris, the passenger 239 can exit the AV 200 to remove the debris. In variations, the AV control system 220 can generate an external alert (529), such as signaling to pedestrians or sounding a horn. Accordingly, once the objects are resolved, the AV control system 220 can execute the egress maneuver and deactivate the sidepod stereo camera system 235.

Once the egress maneuver is performed and the sidepod stereo camera system 235 is deactivated, the AV control system can autonomously operate the AV 200 through road traffic to the destination 219 (540). Over the course of the trip, the AV control system can continuously monitor a speed of the AV 200 to determine whether the speed crosses below a certain threshold (545) (e.g., 5 miles per hour). If not (547), then the AV control system 220 can simply continue operating the AV 200 (540). However, if the AV 200 does decelerate below the threshold speed (549), then the AV control system 220 can activate the sidepod stereo camera system 235 automatically and analyze the camera data 237 for any objects of interest or potential hazards (550). For example, when the AV 200 approaches an intersection or crosswalk, the AV control system 220 can activate the sidepod stereo camera system 235 in order to scan the AV's 200 immediate surroundings and avoid any potential incidents. Once the AV 200 passes through the intersection or crosswalk, or when the AV 200 accelerates above a threshold speed, the AV control system 220 can deactivate the sidepod stereo camera system 235 accordingly.

In some aspects, the AV control system 220 can monitor the route data 232 to determine a distance or time to the destination 219 (555). In such aspects, the AV control system 220 can determine whether the AV 200 is within a threshold distance or time from the destination 219 (560) (e.g., within 20 seconds or 100 meters). If not (564), then the AV control system 220 can continue to monitor the route data 232 and operate the AV 200 accordingly. However if so (562), then the AV control system 220 can activate the sidepod stereo camera system 235 for passenger loading and/or unloading, or to perform a parking maneuver (565).

Various other examples are contemplated to trigger activation and deactivation of the sidepod stereo camera system 235. For example, the AV control system 220 can also monitor a current sub-map 238 to identify the locations in which the AV 200 should be operated in a high caution mode. For example, the current sub-map 238 can indicate high caution areas along the current route such as playgrounds, school zones, crosswalks, high traffic areas, bike lanes, parks, etc. In certain implementations, the AV control system 220 can identify such high caution areas in the sub-map 238, and activate the sidepod stereo camera system 235 when driving through such areas. Once the AV 200 passes through a particular high caution area, the AV control system 220 can deactivate the sidepod stereo camera system 235 accordingly.

The method shown and described with respect to FIG. 5B may be performed by a controller or processing resources of the sidepod stereo camera system 235, such as the processor 604 executing activation/deactivation instructions 612 described below with respect to FIG. 6. Referring to FIG. 5B, the controller can detect a start-up of the AV 200 (570). In some examples, the sidepod stereo camera system 235 can be initialized during the start-up procedure in which various subsystems and drives of the AV 200 are powered on. In variations, the controller can activate the sidepod stereo camera system 235 in response to detecting the start-up (575). In still other variations, the controller can trigger the activation based on other triggers, such as the AV 200 being placed in gear or once a destination 219 is inputted.

Thereafter, the controller can monitor a road speed of the AV 200 (580), and determine whether the road speed crosses a threshold (e.g., 5 miles per hour) (585). For example, the sidepod stereo camera system 235 can remain activated as the AV 200 executes an egress maneuver from a parked state, as long as the AV 200 remains below the threshold speed (587). When the AV 200 accelerates through the threshold speed (589) (e.g., when merging into road traffic), the controller can deactivate the system 235 (590). The controller of the stereo camera system 235 can monitor the speed of the AV 200 by, for example, receiving speedometer data from an on-board computer of the AV 200. Additionally or alternatively, the controller can receive activation 244 and deactivation signals 246 from the AV control system 220. In some examples, the controller activates the sidepod stereo camera system 235 at a first threshold speed (e.g., 5 miles per hour), and deactivates the system 235 at a second threshold speed (e.g., 2 miles per hour). In other examples, the activation and deactivation speeds are the same.

In certain aspects, the controller can monitor the road speed or otherwise detect when the road speed of the AV 200 crosses the threshold (595). When the AV 200 decelerates below the threshold speed (597), the controller can automatically activate the sidepod stereo camera system 235 (599). For example, any time the AV 200 decelerates below 5 miles per hour (e.g., when stopping for a traffic light, a stop or yield sign, a crosswalk, making a pick-up or drop-off, or parking), the controller can activate the sidepod stereo camera system 235 (599). After the AV 200 performs a parking maneuver and powers down, the controller can shut down the sidepod stereo camera system 235 accordingly.

Hardware Diagram

Figure 6:
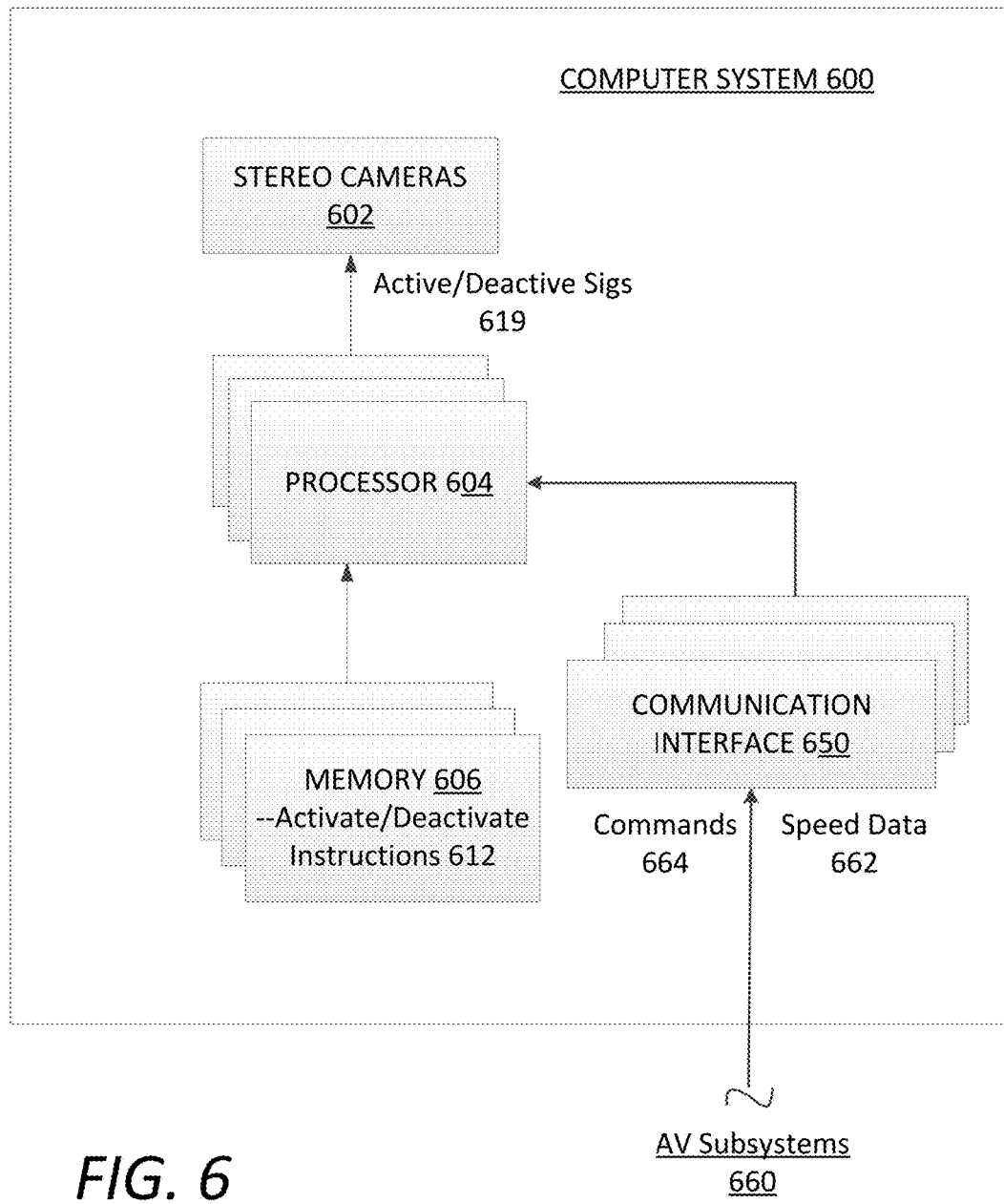
FIG. 6 is a block diagram illustrating a computer system upon which examples described herein may be implemented.

FIG. 6 shows a block diagram of a computer system on which examples described herein may be implemented. For example, the sidepod stereo camera system 235 shown and described with respect to FIGS. 2-4 may be implemented on the computer system 600 of FIG. 6. The computer system 600 can be implemented using one or more processors 604, and one or more memory resources 606. In the context of FIG. 2, the sidepod stereo camera system 235 can be implemented using one or more components of the computer system 600 shown in FIG. 6.

According to some examples, the computer system 600 may be implemented within an autonomous vehicle with software and hardware resources such as described with examples of FIGS. 1 through 4. In an example shown, the computer system 600 can be distributed spatially into various regions of the autonomous vehicle, with various aspects integrated with other components of the autonomous vehicle itself. For example, the processors 604 and/or memory resources 606 can be provided in the trunk of the autonomous vehicle. The various processing resources 604 of the computer system 600 can also execute activation/deactivation instructions 612 using microprocessors or integrated circuits. In some examples, the activation/deactivation instructions 612 can be executed by the processing resources 604 or using field-programmable gate arrays (FPGAs).

In an example of FIG. 6, the computer system 600 can include a local communication interface 650 (or series of local links) to vehicle interfaces and other resources of the autonomous vehicle (e.g., the computer stack drives). In one implementation, the communication interface 650 provides a data bus or other local links to electro-mechanical interfaces of the vehicle, such as wireless or wired links to the AV control system 220.

The memory resources 606 can include, for example, main memory, a read-only memory (ROM), storage device, and cache resources. The main memory of memory resources 606 can include random access memory (RAM) or other dynamic storage device, for storing information and instructions which are executable by the processors 604. The processors 604 can execute instructions for processing information stored with the main memory of the memory resources 606. The main memory 606 can also store temporary variables or other intermediate information which can be used during execution of instructions by one or more of the processors 604. The memory resources 606 can also include ROM or other static storage device for storing static information and instructions for one or more of the processors 604. The memory resources 606 can also include other forms of memory devices and components, such as a magnetic disk or optical disk, for purpose of storing information and instructions for use by one or more of the processors 604.

According to some examples, the memory 606 may store a plurality of software instructions including, for example, activation/deactivation instructions 612. The activation/deactivation instructions 612 may be executed by one or more of the processors 604 in order to implement functionality such as described with respect to the sidepod stereo camera system 235 and/or the AV control system 220 of FIG.

In certain examples, the computer system 600 can receive commands 664 and speed data 662 over the communications interface 650 from various AV subsystems 660 (e.g., the AV control system 220 and an on-board computer respectively). In executing the activation/deactivation instructions 612, the processing resources 604 can monitor the speed data 662 and transmit activation and deactivation signals 619 to the stereo cameras of the sidepod camera system 235 in accordance with examples described herein. Additionally or alternatively, the processor 604 can receive, via the communication interface 650 from the AV control system 220, commands 664 to activate and deactivate the stereo cameras 602, as described herein.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A sidepod stereo camera system for an autonomous vehicle (AV) comprising:
    a sidepod housing mounted to the AV;
    a view pane coupled to the sidepod housing;
    a stereo camera mounted within the sidepod housing, the stereo camera having a field of view comprising a blind spot of a roof-mounted sensor array of the AV and extending outward from the sidepod housing through the view pane, the stereo camera generating stereoscopic image data enabling a control system of the AV to determine distances to potential hazards within the blind spot of the roof-mounted sensor array of the AV; and
    a controller connected to the control system of the AV and operable to activate and deactivate the stereo camera;
    wherein the controller automatically activates the stereo camera in response to detecting the AV decelerating below a threshold speed and automatically deactivates the stereo camera in response to detecting the AV accelerating above the threshold speed;
    wherein the controller automatically activates the stereo camera in response to detecting an initial startup of the AV; and
    wherein the controller monitors the control system of the AV to determine when the control system completes execution of an egress maneuver from a parked state, and automatically deactivates the stereo camera in response to detecting the control system completing the egress maneuver from the parked state.

2. The stereo camera system of claim 1, wherein the stereo camera includes a pair of wide-angle lenses, and wherein the view pane is partially globular.

3. The stereo camera system of claim 1, wherein the controller further automatically activates the stereo camera in response to detecting the AV initiating a parking maneuver.

4. The stereo camera system of claim 1, wherein the sidepod housing comprises a first side-view mirror housing of the AV.

5. The stereo camera system of claim 4, further comprising:
    a second side-view mirror housing mounted to an opposing side of the AV relative to the first side-view mirror housing;
    a second view pane coupled to the second side-view mirror housing; and
    a second stereo camera mounted within the second side-view mirror housing, the second stereo camera having a field of view comprising a second blind spot of the roof-mounted sensor array of the AV and extending outward from the second side-view mirror housing through the second view pane;
    wherein the controller is further operable to activate and deactivate the second stereo camera, and wherein the control system of the AV further processes stereoscopic image data from the second stereo camera in order to determine distances to potential hazards within the field of view of the second stereo camera.

6. The stereo camera system of claim 5, wherein the view panes of the first side-view mirror housing and the second side-view mirror housing comprise one-way mirrors.

7. The stereo camera system of claim 6, wherein the stereo camera and the second stereo camera each include one or more actuators, and wherein the controller operates the one or more actuators to pan the stereo camera and the second stereo camera within the side-view mirror housing and the second side-view mirror housing respectively.

8. The stereo camera system of claim 1, wherein the blind spot comprises at least a portion of an area of interest that is occluded from view by the roof-top sensor array.

9. A computer-implemented method of operating a sidepod stereo camera system of an autonomous vehicle (AV), the method being performed by one or more processors of a control system of the AV and comprising:
    initiating start-up of the AV;
    in response to initiating start-up of the AV, activating the sidepod stereo camera system, the sidepod stereo camera system comprising a plurality of stereo cameras situated within a plurality of side-mounted pods of the AV to enable the control system of the AV to determine distances to potential hazards within a field of view of each of the plurality of stereo cameras, the field of view of each of the plurality of stereo cameras comprising a blind spot of a roof-mounted sensor array of the AV;
    autonomously controlling steering, acceleration, and braking systems of the AV to execute an egress maneuver from a parked state;
    monitoring stereoscopic image data from the plurality of stereo cameras while executing the egress maneuver; and
    in response to completing the egress maneuver, deactivating the sidepod stereo camera system and processing sensor data from the roof-mounted sensor array to autonomously drive the AV.

10. The method of claim 9, wherein the plurality of side-mounted pods includes a left side-mounted pod and a right side-mounted pod.

11. The method of claim 10, wherein the left side-mounted pod and the right side-mounted pod comprise a left and a right side-view mirror housing of the AV, and wherein the plurality of stereo cameras comprise a first stereo camera mounted within the left side-view mirror housing, and a second stereo camera mounted within the right side-view mirror housing.

12. The method of claim 11, wherein the left and the right side-view mirror housings each include a view pane, and wherein a field of view of each of the first and the second stereo cameras extend outward through the view pane respectively.

13. The method of claim 9, further comprising:
    in response to decelerating the AV below a threshold speed, activating the sidepod stereo camera system; and
    monitoring the stereoscopic image data from the sidepod stereo camera system for potential hazards.

14. The method of claim 13, further comprising:
    in response to accelerating the AV above the threshold speed, deactivating the sidepod stereo camera system.

15. The method of claim 9, further comprising:
    detecting one or more objects within the field of view of at least one of the plurality of stereo cameras; and
    in response to detecting the one or more objects, determining whether circumvention of the one or more objects is possible by executing an avoidance maneuver.

16. The method of claim 15, further comprising:
    when circumvention of the one or more objects by executing an avoidance maneuver is not possible, generating at least one of an external alert or a notification to a passenger of the AV.

17. The method of claim 15, further comprising:
when circumvention of the one or more objects by executing an avoidance maneuver is possible, executing the avoidance maneuver to egress from the parked state.

18. A non-transitory computer readable medium storing instructions that, when executed by one or more processors of an autonomous vehicle (AV) control system, cause the one or more processors to:
- initiate startup of the AV;
- in response to initiating start-up of the AV, activate a sidepod stereo camera system, the sidepod stereo camera system comprising a plurality of stereo cameras being situated within a plurality of side-mounted pods of the AV to enable a control system of the AV to determine distances to potential hazards within a field of view of each of the plurality of stereo cameras, the field of view of each of the plurality of stereo cameras comprising a blind spot of a roof-mounted sensor array of the AV;
- autonomously control steering, acceleration, and braking systems of the AV to execute an egress maneuver from a parked state;
- monitor stereoscopic image data from the sidepod stereo camera system while executing the egress maneuver; and
- in response to completing the egress maneuver, deactivate the sidepod stereo camera system and process sensor data from the roof-mounted sensor array to autonomously drive the AV.

19. The non-transitory computer-readable medium of claim 18, wherein the executed instructions further cause the one or more processors to:
- detect one or more objects within the field of view of at least one of the plurality of stereo cameras; and
- in response to detecting the one or more objects, determine whether circumvention of the one or more objects of interest is possible by executing an avoidance maneuver.

20. The non-transitory computer readable medium of claim 19, wherein the executed instructions further cause the one or more processors to:
- when circumvention of the one or more objects by executing an avoidance maneuver is not possible, generate at least one of an external alert or a notification to a passenger of the AV;
- when circumvention of the one or more objects by executing an avoidance maneuver is possible, execute the avoidance maneuver to egress from the parked state.

* * * * *